(12) United States Patent
Shimazaki (10) Patent No.: US 8,678,949 B2
(45) Date of Patent: Mar. 25, 2014

(54) GOLF CLUB HEAD AND MANUFACTURING METHOD FOR THE SAME

(75) Inventor: Hideo Shimazaki, Tokyo (JP)

(73) Assignee: Bridgestone Sports Co., Ltd, Tokyo (JP)

( * ) Notice: Subject to any disclaimer, the term of this patent is extended or adjusted under 35 U.S.C. 154(b) by 309 days.

(21) Appl. No.: 13/276,989

(22) Filed: Oct. 19, 2011

(65) Prior Publication Data

US 2013/0102415 A1    Apr. 25, 2013

(51) Int. Cl.
*A63B 53/08* (2006.01)
(52) U.S. Cl.
USPC ............ 473/345; 473/346; 473/329; 473/349
(58) Field of Classification Search
USPC .................................. 473/345, 346, 329, 349
See application file for complete search history.

(56) References Cited

U.S. PATENT DOCUMENTS

| | | | |
|---|---|---|---|
| 7,798,916 B2 * | 9/2010 | Matsunaga et al. ........... | 473/329 |
| 7,942,759 B2 * | 5/2011 | Matsunaga et al. ........... | 473/342 |
| 2009/0239680 A1 * | 9/2009 | Horacek et al. ............... | 473/346 |
| 2010/0029404 A1 * | 2/2010 | Shear ........................... | 473/329 |

FOREIGN PATENT DOCUMENTS

| | | |
|---|---|---|
| JP | 6-327796 A | 11/1994 |
| JP | 2635508 B2 | 7/1997 |
| JP | 9-266964 A | 10/1997 |
| JP | 2001-204857 A | 7/2001 |
| JP | 3093448 U | 5/2003 |
| JP | 2004-167115 A | 6/2004 |
| JP | 2004-242938 A | 9/2004 |
| JP | 3663620 B2 | 6/2005 |
| JP | 2007-151758 A | 6/2007 |
| JP | 2008-093267 A | 4/2008 |
| JP | 2008-212412 A | 9/2008 |

* cited by examiner

*Primary Examiner* — Benjamin Layno
(74) *Attorney, Agent, or Firm* — Sughrue Mion, PLLC (57) ABSTRACT

A golf club head manufacturing method, including: welding a first reinforcing piece with first thickness to a central portion between a toe and a heel, so as to extend along an edge of a face side of a sole part, the sole part being part of a lower part formed integrally with a side part; welding a second reinforcing piece of second, larger thickness to a central portion between the toe and heel so as to extend along the edge on the face side of the first piece; welding a face part to the first and second pieces from an inner space of the lower part; welding a hosel part to the lower and face parts; welding a crown part to the lower, face and hosel parts; and welding the lower and face parts together from the outside.

9 Claims, 11 Drawing Sheets

GOLF CLUB HEAD AND MANUFACTURING METHOD FOR THE SAME

CROSS-REFERENCE TO RELATED APPLICATIONS

The present invention relates to Japanese Patent Application No. 2010-226731 and Japanese Patent Application No. 2010-226732, filed on Oct. 6, 2010, by Hideo Shimazaki, an inventor.

BACKGROUND OF THE INVENTION

The present invention relates to a golf club head having a hollow structure and made of a metal and a manufacturing method for the same, more particularly to a wood type or similar type golf club head and a manufacturing method for the same.

As the wood type golf club head represented by a driver and a fairway wood, the club heads having a hollow structure and made of a metal have been widely used. Generally, the wood type golf club head having the hollow structure includes a face part for hitting a ball, a crown part constituting an upper face part of the golf club head, a sole part constituting a bottom face part of the golf club head, a side part constituting a side face parts on a toe side, a back side and a heel side of the golf club head, and a hosel part. A shaft is inserted into the hosel part of this golf club head and is fixed thereto with adhesive or the like. Recently, a variety of golf head clubs called "utility clubs" have been marketed, and as a kind of such a utility golf club head, a variety of golf club heads resembling the aforementioned wood type golf club head (i.e., golf club head including the face part, the sole part, the side part, the crown part and the hosel part) have also been marketed.

Although as a metal for forming this hollow golf club head, aluminum alloy, stainless and titanium alloy are used, in particular, titanium alloy has been widely used in recent years. As for a method for manufacturing the metallic hollow golf club head, Japanese Unexamined Patent Application Publication No. H6-327796 discloses in paragraph of its specification a method in which a face member is welded on a head main body having a sole part and a side part, and next, a hosel member is welded thereto, and, a crown member is welded thereto, followed by a finishing work.

To increase a flying distance of the metallic hollow golf club head, a variety of golf club heads capable of hitting a ball over a long distance by raising the coefficient of restitution of the ball due to deflection of the face surface (generally called the "trampoline effect") were marketed. However, the official golf rules have been revised to restrict excessive fly of the ball, and consequently, the coefficient of restitution has been restricted. Furthermore, the volume of the golf club head has been limited to 460 cc or less.

SUMMARY OF THE INVENTION

In a large-size golf club head having a volume around 460 cc, the thickness of the sole part, the side part, and the crown part is often reduced to decrease the weight of the golf club.

If the thickness is small, shrinkage of welds in the sole part, crown part, and face part that are welded together can lower strength of joint portions between the sole part, the crown part, and the face part.

In particular, in the vicinity of the center in the toe-to-heel direction (a direction connecting the toe side of the golf club head with the heel side, i.e., the hosel part side, which is perpendicular to the direction of a ball flying line) of a face side edge of each of the sole part and the crown part, a large stress is generated when a ball is hit because this area is near the central area of the face part which hits the ball. Thus, a welded joint between an area in the vicinity of the center of each of the face side edge of the sole part and the crown part and the face part needs to have sufficient strength.

When a ball is hit with the large size golf club head, if the thickness of the sole part or the crown part is less than sufficient, a hitting sound becomes dead, so that even when the ball is hit well, a player and people nearby might misidentify that he or she missed a shot.

A first object of the present invention is to provide a golf club head in which a welded joint between an area in the vicinity of the center of the sole part and the face part has a high strength and a manufacturing method for the same.

A second object of the present invention is to provide a golf club head in which a welded joint between an area in the vicinity of the center of the sole part and the face part has a high strength while a ball impact sound produced is improved, and a manufacturing method for the same.

According to a first aspect of the present invention, there is provided a golf club head having a hollow structure, which is made of a metal, including a face part, a sole part, a side part, a crown part, and a hosel part, the golf club head including a lower part having the sole part and the side part which are integrated with each other, the face part, the hosel part and the crown part being welded on the lower part, in which a thin-plate reinforcing piece extending along a face side edge of the sole part is welded to the vicinity of the center in the toe-to-heel direction of an upper surface adjacent to the face side edge of the sole part, and in which a thick reinforcing piece is welded to a central portion in the toe-to-heel direction of the thin-plate reinforcing piece, the thin-plate reinforcing piece and the thick reinforcing piece being welded on the face part.

In the golf club head of this aspect, the thickness of the sole part may be 0.8 to 1.5 mm, the thickness of the thin-plate reinforcing piece may be 0.8 to 1.5 mm and the thickness of the thick reinforcing piece may be 1.0 to 6.0 mm.

In the golf club head of this aspect, the length in the toe-to-heel direction of the thin-plate reinforcing piece may be 20 to 50 mm, the length in a direction along a ball flying line of the thin-plate reinforcing piece may be 6 to 20 mm, the length in the toe-to-heel direction of the thick reinforcing piece may be 10 to 43 mm and the length in the direction along the ball flying line of the thick reinforcing piece may be 3 to 20 mm.

According to a second aspect of the present invention, there is provided a method for manufacturing the golf club head of the first embodiment, including: a step of welding the thin-plate reinforcing piece to the upper surface adjacent to the face side edge of the sole part; a step of welding the thick reinforcing piece to the upper surface of the thin-plate reinforcing piece; a step of welding a face part to a lower part comprising the thin-plate reinforcing piece and the thick reinforcing piece from an inner space of the lower part; a step of welding a hosel part to the lower part and the face part; a step of welding a crown part to the lower part, the face part and the hosel part; and a step of welding the face part to the crown part, the hosel part and the lower part from an outer side of the golf club head.

According to a third aspect of the present invention, there is provided a golf club head having a hollow structure, which is made of a metal, including a face part, a sole part, a side part, a crown part and a hosel part, in which a thin-plate reinforcing piece extending along a face side edge of each of the sole part and the crown part is welded on an upper surface adjacent to the face side edge of the sole part and a lower surface adjacent to the face side edge of the crown part, the thin-plate reinforcing pieces being welded to the face part.

In the golf club head of this aspect, the thickness of the sole part may be 0.8 to 1.5 mm, the thickness of the thin-plate reinforcing piece on the sole part may be 0.8 to 1.5 mm, the thickness of the crown part may be 0.6 to 1.2 mm and the thickness of the thin-plate reinforcing piece on the crown part may be 0.8 to 1.5 mm.

In the golf club head of this aspect, the length in the toe-to-heel direction of the thin-plate reinforcing piece on the sole part may be 20 to 50 mm, the length in a direction along a ball flying line thereof may be 6 to 20 mm, the length in the toe-to-heel direction of the thin-plate reinforcing piece on the crown part may be 20 to 50 mm, and the length in the direction along the ball flying line thereof may be 6 to 20 mm.

In the golf club head of this aspect, the face part, the hosel part and the crown part may be welded to the lower part which is formed by integrating the sole part with the side part.

According to a fourth aspect of the present invention, there is provided a method for manufacturing the golf club head of the third embodiment, including: a step of welding the thin-plate reinforcing piece to the upper surface adjacent to the face side edge of the sole part; a step of welding the thin-plate reinforcing piece to a lower surface adjacent to the face side edge of the crown part; a step of welding a face part to a lower part having the thin-plate reinforcing piece from an inner side of the lower part; a step of welding a hosel part to the lower part and the face part; a step of welding a crown part having the thin-plate reinforcing piece to the lower part, the face part and the hosel part; and a step of welding the crown part, the lower part and the face part together from an outer side of the golf club head.

In the golf club head according to the present invention, the thin-plate reinforcing piece is welded to the vicinity of the center in the toe-to-heel direction of the upper surface adjacent to the face side edge of the sole part. This thin-plate reinforcing piece extends in the toe-to-heel direction. The thick reinforcing piece is welded to the upper surface in the vicinity of the center in the toe-to-heel direction of this thin-plate reinforcing piece. This is because, in the vicinity of the center of the sole part, the thin-plate reinforcing piece and the thick reinforcing piece are welded to the face part, shrinkage of welds hardly affects the sole part, whereby securing a high welding strength between the area in the vicinity of the center of the sole part and the face part.

Because the thick reinforcing piece exists in the center in the toe-to-heel direction of the face side edge of the sole part, deflection of the face part upon an impact is suppressed, thereby limiting the coefficient of restitution of the golf club head.

In the golf club head according to the present invention, the thin-plate reinforcing piece is welded to the vicinity of the center in the toe-to-heel direction of each of the upper surface adjacent to the face side edge of the sole part and the lower surface adjacent to the face side edge of the crown part. This thin-plate reinforcing piece extends in the toe-to-heel direction. Because in the vicinity of the center in the toe-to-heel direction of each of the sole part and the crown part, the thin-plate reinforcing pieces are welded to the face part, those parts are reinforced. Furthermore, the shrinkage of welds hardly affects the sole part and the crown part, so that a high welding strength is secured between the vicinity of the center of the sole part and the crown part and the face part.

Additionally, because the thin-plate reinforcing piece exists in the vicinity of the center in the toe-to-heel direction of each of the sole part and the crown part, the natural frequencies of the sole part and the crown part are changed compared to a case in which no thin-plate reinforcing piece exists, and consequently, a hitting sound upon an impact is improved.

DETAILED DESCRIPTION OF THE PREFERRED EMBODIMENT

Hereinafter, a golf club head according to a first embodiment of the present invention will be described with reference to FIGS. 1 to 7.

Figure 1A:
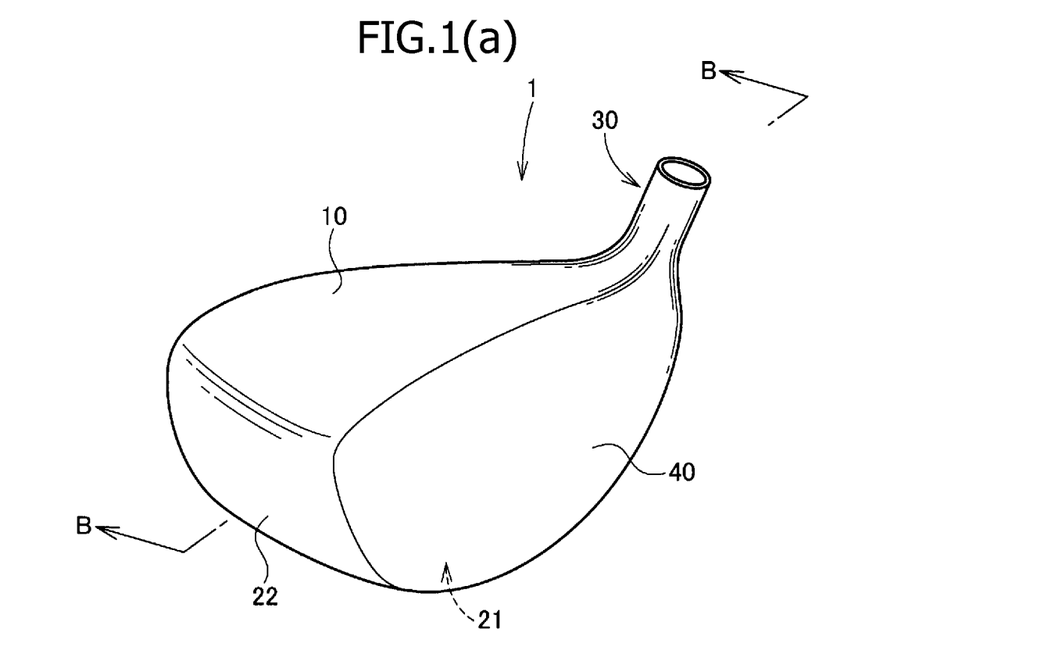
FIG. 1A is a perspective view illustrating an embodiment of a golf head club according to the present invention.
Figure 1B:
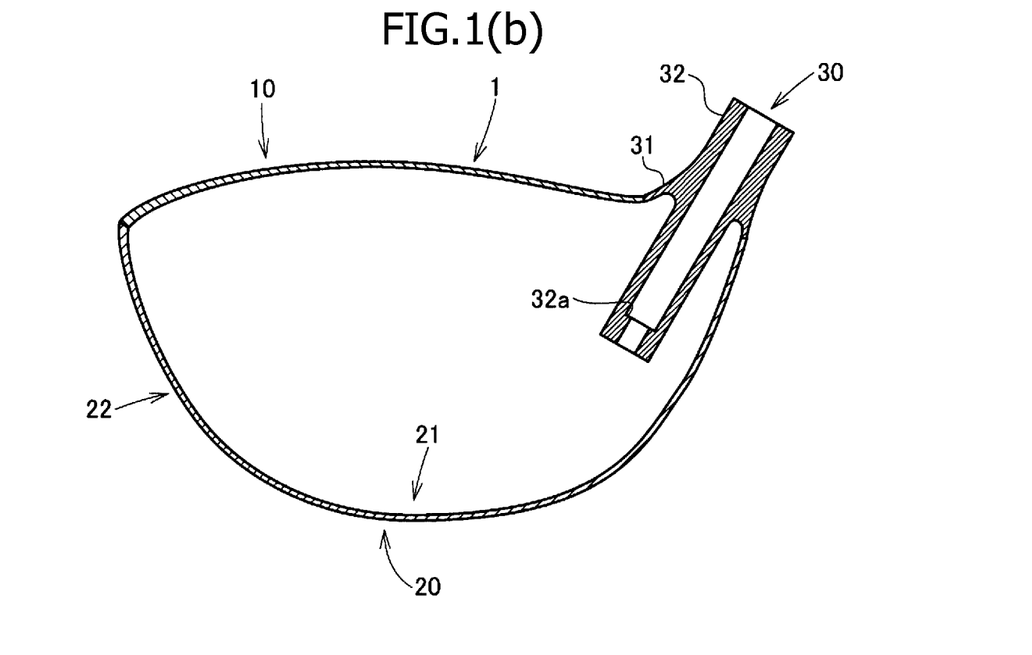
FIG. 1B is a sectional view taken along the line B-B in FIG. 1A.
Figure 2:
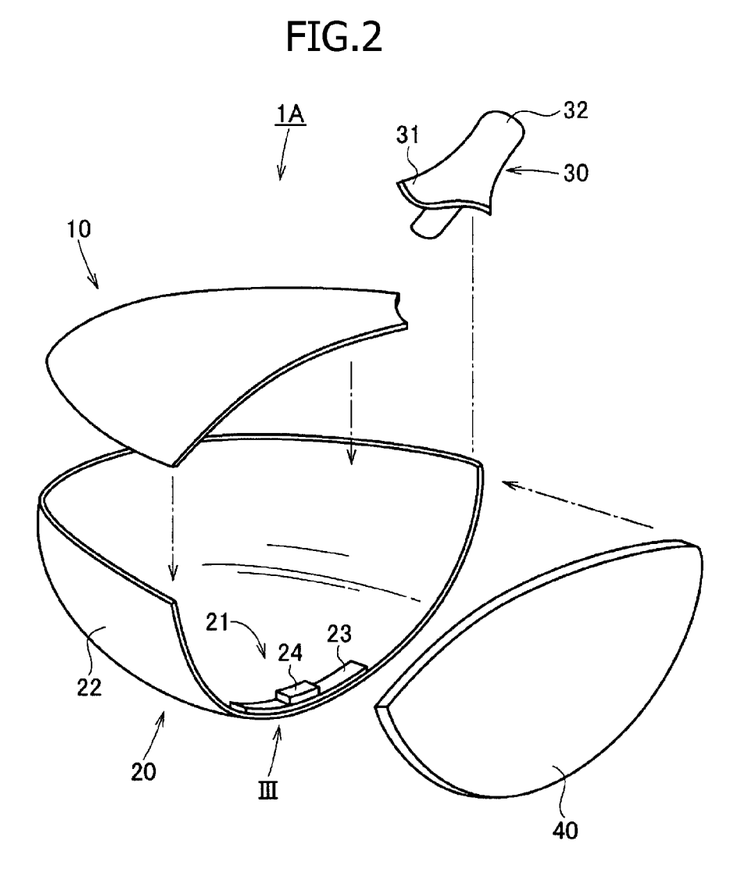
FIG. 2 is an exploded perspective view illustrating an embodiment of the golf head club according to the present invention.

As shown in FIG. 1, this golf club head 1 includes a crown part 10, a lower part 20, a hosel part 30, and a face part 40, which are integrated with each other by welding. As shown in FIG. 2, the lower part 20 includes a sole part 21 and a side part 22 rising from the sole part 21. The side part 22 extends from a toe side to a heel side via a back side.

The hosel part 30 includes a substantially bell-shaped skirt part 31 and a column 32 projecting upward and downward from the skirt part 31. As shown in FIG. 1B, a stepped part 32a having a small diameter is provided near a bottom end of the inner surface of the column 32. A shaft (not shown) is inserted into the hosel part 30 until an end thereof butts this stepped part 32a and is fixed with adhesive. Although, according to this embodiment, the hosel part 30 is so provided that a bottom end of the column 32 does not reach the sole part 21, it may be provided so that the bottom end of the column 32 reaches the sole part 21.

The crown part 10, the lower part 20, the hosel part 30, the face part 40, and a thin-plate reinforcing piece 23 and a thick reinforcing piece 24, which will be described below, are manufactured of titanium or titanium alloy by casting, forging or press forming. The thin-plate reinforcing piece 23 and the thick reinforcing piece 24 may be manufactured by cutting a sheet material. The sole part 21 and the thin-plate reinforcing piece 23 are preferred to be manufactured of a material having an excellent cold-workability such as pure titanium, Ti-3AL-2.5V, Ti-1.5Al. The sole part 21 is preferred to be more workable than ordinary Ti-6Al-4V to be marked with a commercial logo or an indentation.

The thin-plate reinforcing piece 23 is welded to the vicinity of the center in a toe-to-heel direction of an upper surface adjacent to the face side edge of the lower part 20 and the thick reinforcing piece 24 is welded on an upper surface of a central portion in the toe-to-heel direction of this thin-plate reinforcing piece 23. The thick reinforcing piece 24 is disposed at a central portion in the toe-to-heel direction of the golf club head 1 and located just below the center of the face surface. The thin-plate reinforcing piece 23 and the thick reinforcing piece 24 are disposed such that each of their face side edges is aligned with the face side edge of the lower part 20. In this embodiment, the thin-plate reinforcing piece 23 is fused with the sole part 21 by spot-welding and reference numeral 23w in FIG. 3 indicates this welding mark. The thick reinforcing piece 24 is fused with the thin-plate reinforcing piece 23 by spot-welding. Reference numeral 24w indicates this welding mark.

Preferably, the thickness of the sole part 21 is 0.8 to 1.5 mm, more particularly 0.8 to 1.1 mm. Preferably, the thickness of the thin-plate reinforcing piece 23 is 0.8 mm to 1.5 mm, more preferably 1.0 mm to 1.2 mm. Preferably, the thickness of the thick reinforcing piece 24 is 1.0 mm to 6.0 mm, more preferably 1.0 to 3.0 mm. Preferably, the length of the thin-plate reinforcing piece 23 in the toe-to-heel direction is 20 mm to 50 mm, more preferably 25 mm to 40 mm. The length of the thin-plate reinforcing piece 23 in the direction of a ball flying line (length (width) perpendicular to the face surface) is 6 to 20 mm, more preferably 8 mm to 20 mm. The length of the thick reinforcing piece 24 in the direction of the ball flying line is 3 mm to 20 mm, more preferably 5 mm to 15 mm. The length of the thick reinforcing piece 24 in the direction of the ball flying line is desired to be equal to or less than the length of the thin-plate reinforcing piece 23 in the ball flying line and is preferred to be 50% or less.

Figure 3:
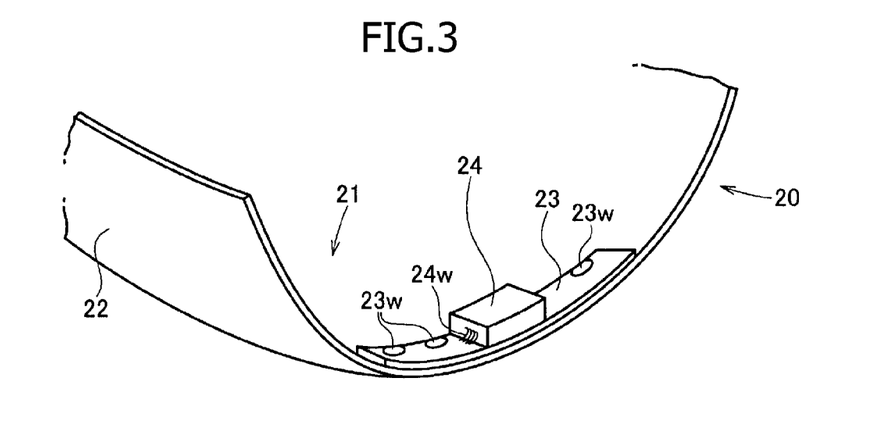
FIG. 3 is an enlarged view of a portion III in FIG. 2.
Figure 4:
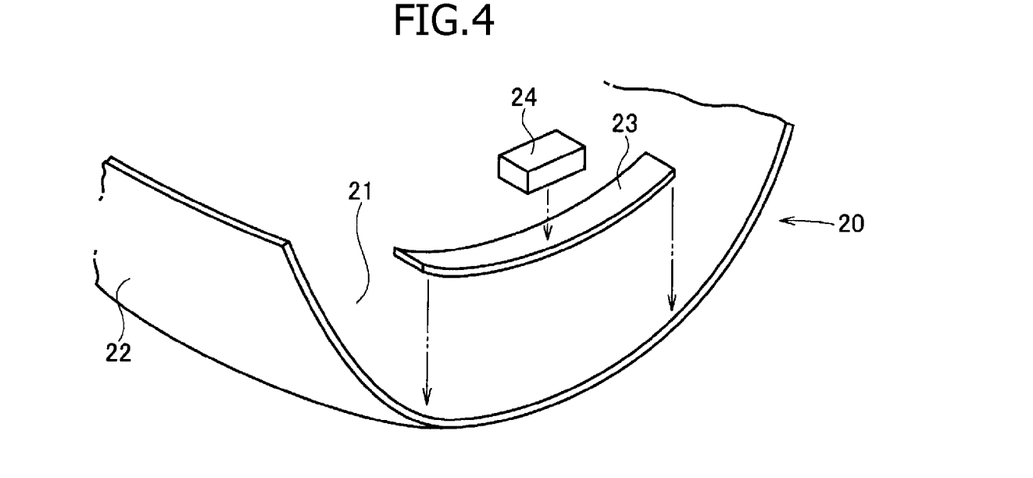
FIG. 4 is a perspective view illustrating an embodiment of a manufacturing method for the golf head club head according to the present invention.
Figure 7:
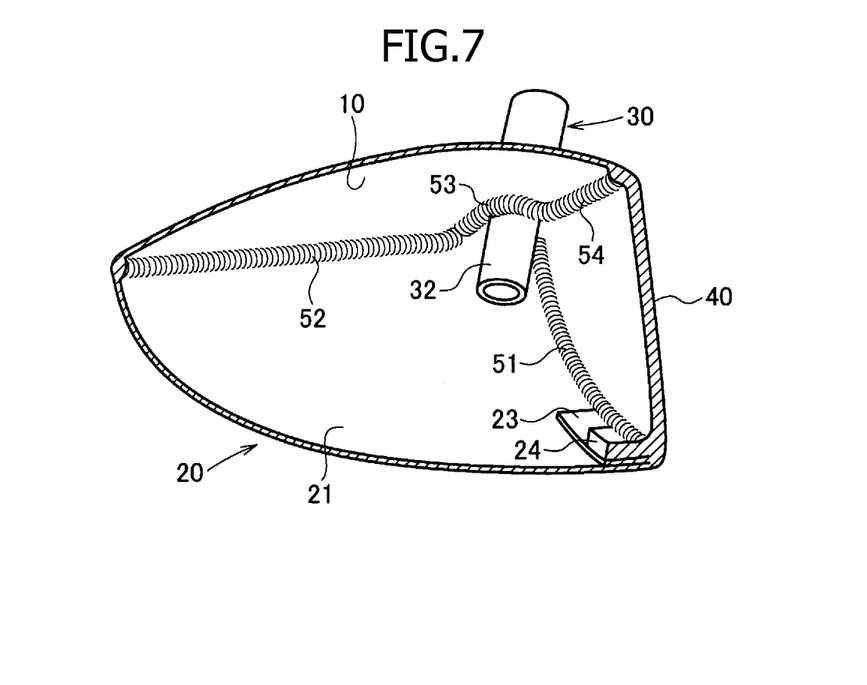
FIG. 7 is a sectional view of an embodiment of the golf club head according to the present invention, taken along a back-and-forth direction, illustrating the interior of the golf club head seen from slightly backward.

To manufacture the golf club head 1, first, the thin-plate reinforcing piece 23 is spot-welded on the upper surface adjacent to the face side edge of the sole part 21 of the lower part 20 at plural positions as shown in FIG. 4, and next, the thick reinforcing piece 24 is spot-welded on this thin-plate reinforcing piece 23 as shown in FIG. 3. Next, the face part 40 is attached to the lower part 20, and by TIG-welding with argon gas blown to the lower part 20 from the inner space of the lower part 20, that is, from the back side of the face part 40, the lower part 20 is integrated with the face part 40 to produce a condition shown in FIG. 5. Reference numeral 51 in FIG. 7 shows a welded metal which is generated on inner surfaces of the lower part 20 and the face part 40 by fusion. This welded metal 51 runs through the face side edge above the thin-plate reinforcing piece 23 and the thick reinforcing piece 24 and this welded metal 51 integrates the sole part 21 including the thin-plate reinforcing piece 23 and the thick reinforcing piece 24 with the face part 40.

Figure 5:
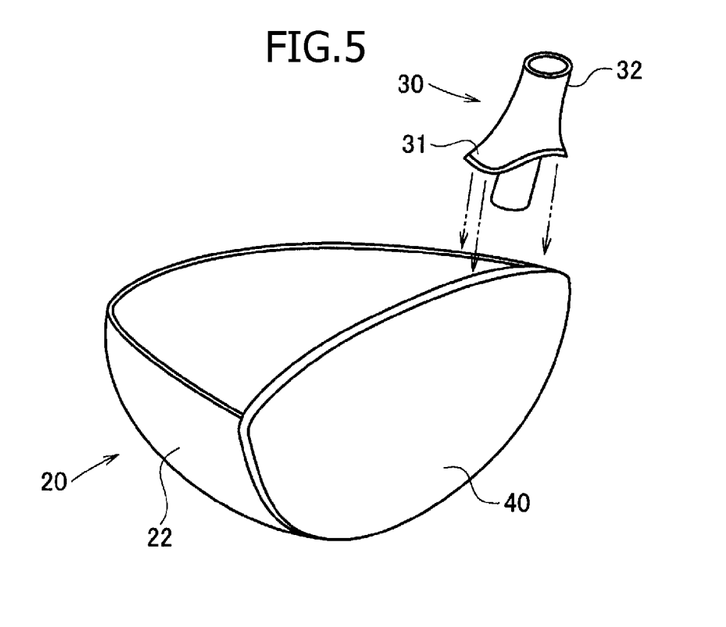
FIG. 5 is a perspective view illustrating an embodiment of a manufacturing method for the golf head club head according to the present invention.
Figure 6:
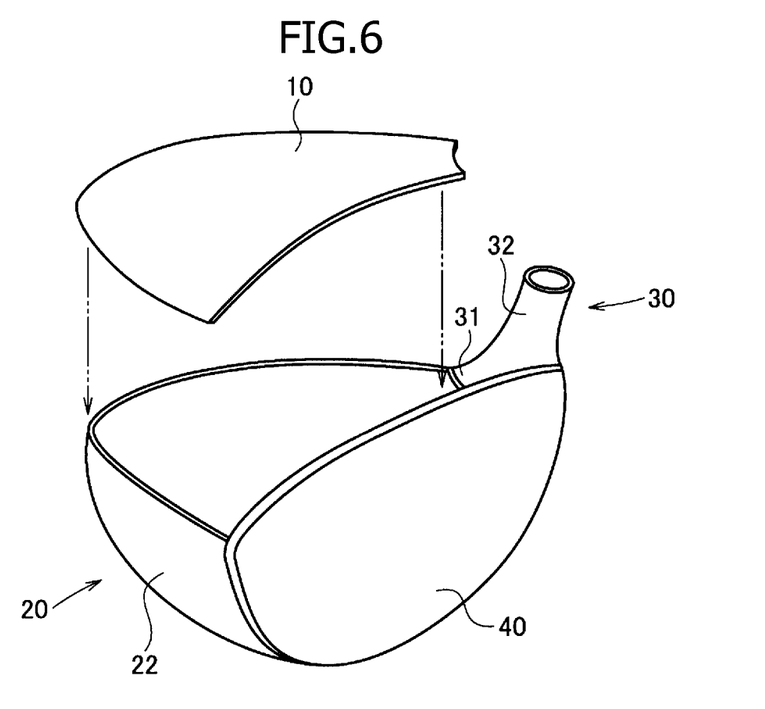
FIG. 6 is a perspective view illustrating an embodiment of a manufacturing method for the golf head club head according to the present invention.

As shown in FIG. 5, the skirt part 31 of the hosel part 30 is fit to upper edges of the lower part 20 and the face part 40, and the skirt part 31 is TIG-welded by blowing argon gas on the upper edges of the lower part 20 and the face part 40 while a lie angle is adjusted to produce a condition as shown in FIG. 6. At this time, the welding is preferred to be carried out in both ways from the inside and the outside of the lower part 20.

Next, the crown part 10 is mounted on the lower part 20 and the face part 40, and brought in contact with the skirt part 31 of the hosel part 30. Then, the crown part 10 is TIG-welded on the lower part 20, the face part 40, and the skirt part 31 by blowing argon gas from the outside of the golf club head 1. At the same time, the face part 40 is TIG-welded by blowing argon gas from the outside of the face part 40 against an entire circumference of the face part 40. As a result, the entire circumference of the face part 40 is welded on the lower part 20 again. When welding the entire circumference of the face part 40, a face side of the thin-plate reinforcing piece 23 is entirely welded while welding beads are formed successively from the outside to the inside of the head.

Reference numeral 52 in FIG. 7 indicates a welded metal between the lower part 20 and the crown part 10, reference numeral 53 indicates a welded metal between the crown part 10 and the skirt part 31 and reference numeral 54 indicates a welded metal between the crown part 10 and the face part 40.

After welding the crown part 10, the lower part 20, the hosel part 30 and the face part 40, a variety of finishing work such as grinding and painting are implemented to complete a golf club head product.

In the golf club head 1 having the above-described configuration, the thin-plate reinforcing piece 23 is spot-welded to the vicinity of the center in the toe-to-heel direction of the upper surface adjacent to the face side edge of the lower part 20 and the thick reinforcing piece 24 is spot-welded on the thin-plate reinforcing piece 23. An area in the vicinity of the center of a bottom edge of the face part 40 is welded on both the thin-plate reinforcing piece 23 and the thick reinforcing piece 24. In the vicinity of the center of the face side edge of the sole part 21 provided with the thin-plate reinforcing piece 23, shrinkage of weld between the face part 40 and the sole part 21 hardly affects the sole part 21, and a high weld strength is secured between the vicinity of the center of the face side edge of the sole part 21 and the face part 40. Particularly in an area corresponding to the thick reinforcing piece 24, the weld strength between the sole part 21 and the face part 40 is high. Additionally, because the thick reinforcing piece 24 is located in the center in the toe-to-heel direction of the face side edge of the sole part 21, deflection of the face part 40 upon an impact is suppressed, thereby limiting the coefficient of restitution of the golf club head 1.

In this golf club head 1, the thickness of the sole part 21 is small, and the thin-plate reinforcing piece 23 is provided only in the vicinity of the center of the face side edge of the sole part 21 while the thick reinforcing piece 24 is provided only at the central portion in the toe-to-heel direction of the thin-plate reinforcing piece 23. Thus, increase in the weight of the golf club head 1 is suppressed to be extremely small. Furthermore, because the widths in the direction of a ball flying line of the thin-plate reinforcing piece 23 and the thick reinforcing piece 24 are small, the depth of the gravity center of the golf club head 1 is rarely decreased.

The above-described first embodiment is an example of the present invention and the present invention may be carried out in the form of other embodiments. For example, a gap may be provided between the thin-plate reinforcing piece 23 on the sole side and the sole part 21. In this case, the spot-welding is implemented partially at plural positions along an edge of the thin-plate reinforcing piece, so that the characteristic of radiation of welding heat is improved. Although the above embodiment employs TIG-welding, it is permissible to employ plasma welding. The widths on the toe side and the heel side of the thin-plate reinforcing piece 23 may be smaller than the width thereof in the center in the longitudinal direction. The thickness of the thick reinforcing piece 24 may be increased toward the face side.

Figure 8:
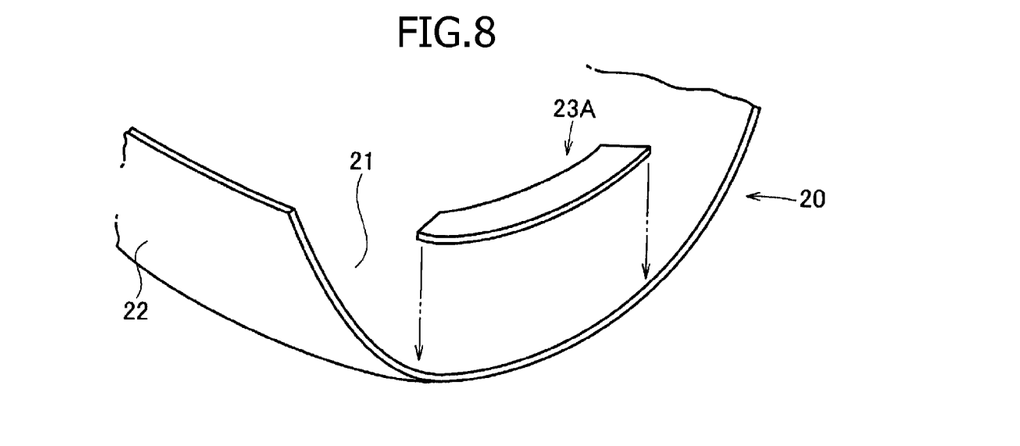
FIG. 8 is a perspective view illustrating another embodiment of a manufacturing method for the golf head club according to the present invention.
Figure 9:
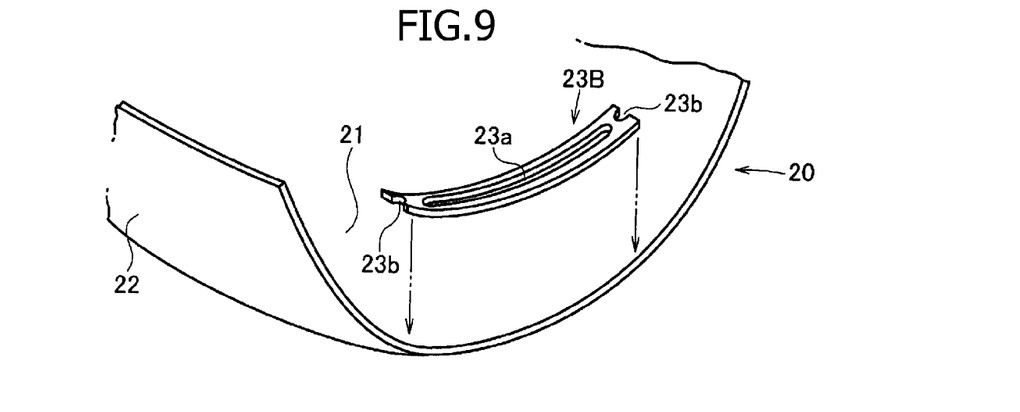
FIG. 9 is a perspective view illustrating another embodiment of a manufacturing method for the golf head club according to the present invention.
Figure 10:
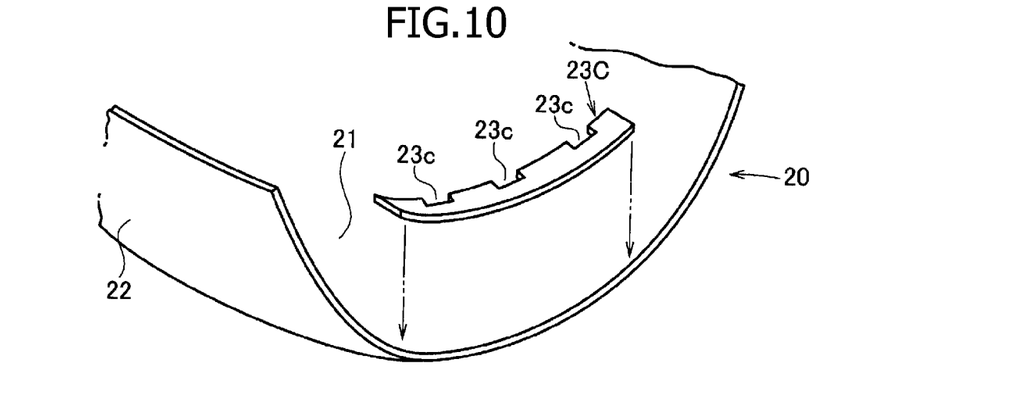
FIG. 10 is a perspective view illustrating another embodiment of a manufacturing method for the golf head club according to the present invention.

Other examples of the shape of the thin-plate reinforcing piece 23 are shown in FIGS. 8 to 10. FIG. 8 shows a trapezoidal thin-plate reinforcing piece 23A whose length in the toe-to-heel direction is decreased toward the back.

FIG. 9 shows a thin-plate reinforcing piece 23B having a punched-out part 23a and cut-out parts 23b. The punched-out part 23a is formed of an elongated oval hole extending in the longitudinal direction of the thin-plate reinforcing piece 23B. Also, plural punched-out parts may be provided. The cut-out parts 23b may be provided in each short side of both ends of the thin-plate reinforcing piece 23B.

The thin-plate reinforcing pieces 23A, 23B shown in FIG. 8 and FIG. 9 are lighter than the thin-plate reinforcing piece 23.

FIG. 10 shows a thin-plate reinforcing piece 23C having plural cut-out parts 23c provided at a rear side. This thin-plate reinforcing piece 23C is lighter than the thin-plate reinforcing piece 23 and due to provision of the cut-out parts 23c, is easy to deform into a curved shape along the sole part 21. Also, the cut-out part 23c is not limited to a square as shown in the figure but may be formed in other various shapes such as a triangle, semicircle, and semiellipse.

The thin-plate reinforcing pieces of FIG. 8 and FIG. 9 also may be provided with the cut-out parts at their rear side in the same way as FIG. 10, although this is not shown. Furthermore, the thin-plate reinforcing pieces of FIG. 9 and FIG. 10 may be formed into a trapezoidal or other shape.

Hereinafter, another golf club head according to a second embodiment and a manufacturing method for the same will be described with reference to FIGS. 11 to 18.

Figure 11A:
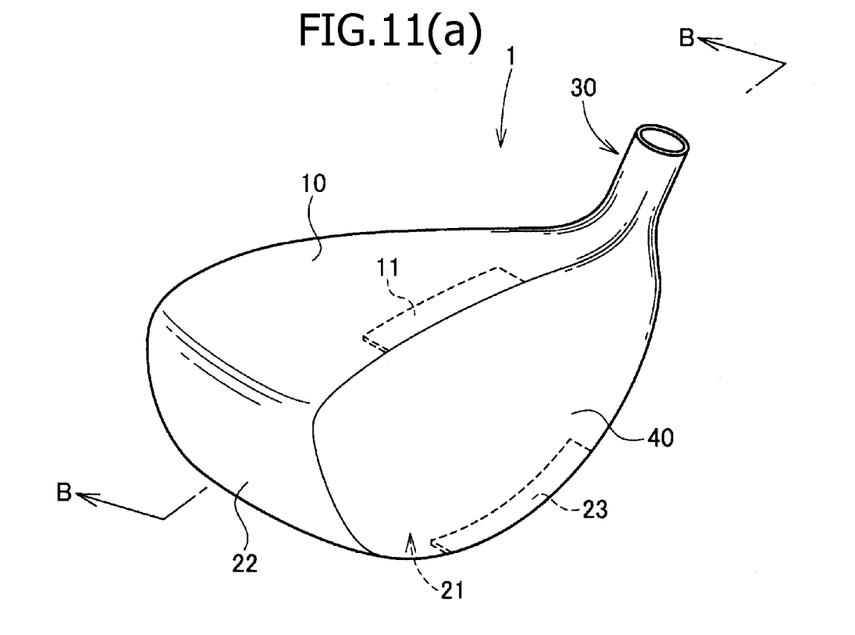
FIG. 11A is a perspective view illustrating another embodiment of the golf club head according to the present invention.
Figure 11B:
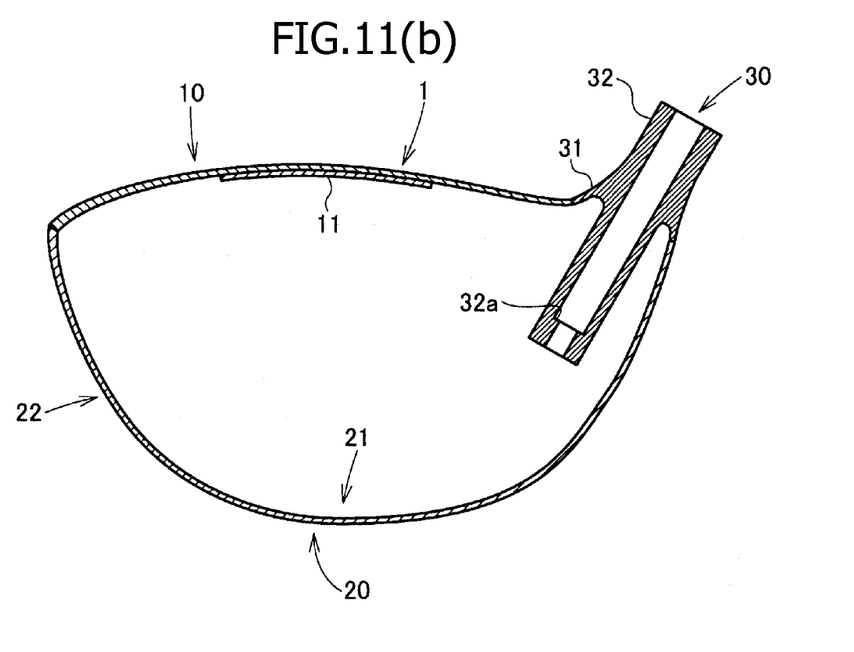
FIG. 11B is a sectional view taken along the line B-B in FIG. 11A.
Figure 12:
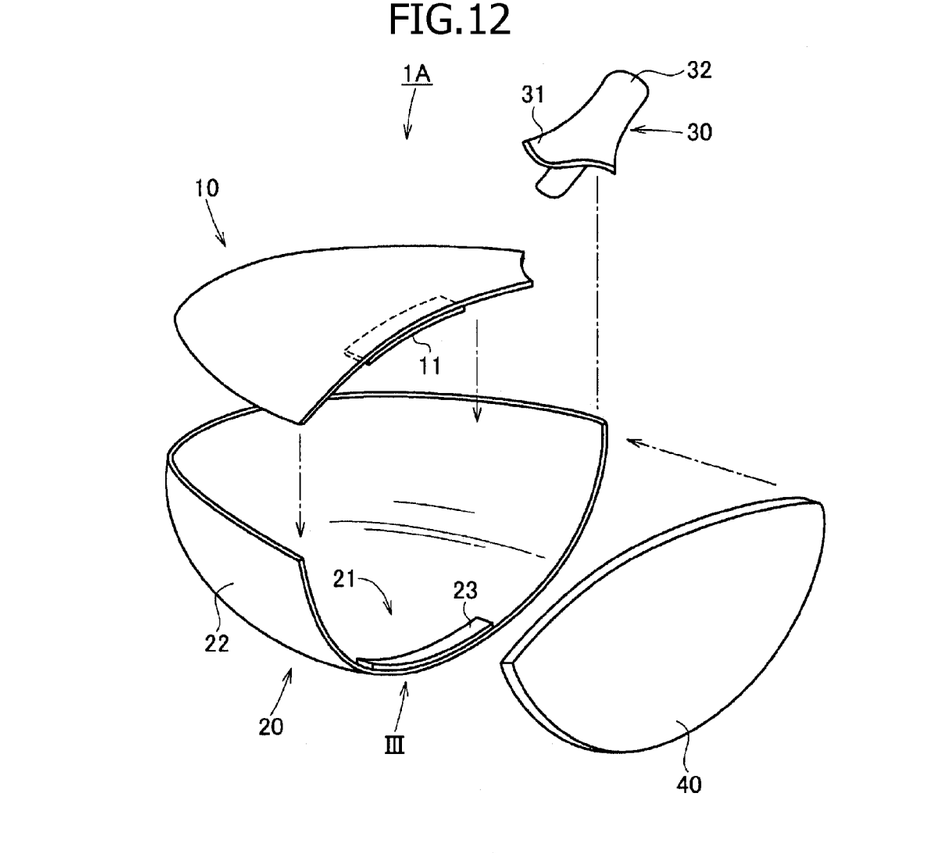
FIG. 12 is an exploded perspective view illustrating another embodiment of the golf club head according to the present invention.

As shown in FIG. 11, this golf club head 1 includes a crown part 10, a lower part 20, a hosel part 30 and a face part 40, which are integrated with each other by welding. As shown in FIG. 12, the lower part 20 includes a sole part 21 and a side part 22 rising from the sole part 21. The side part 22 extends from the toe side to the heel side through the back side.

The hosel part 30 includes a substantially bell-shaped skirt part 31 and a column 32 projecting upward and downward from the skirt part 31. As shown in FIG. 11B, a stepped part 32a having a small diameter is provided near a bottom end of the inner surface of the column 32. A shaft (not shown) is inserted into the hosel part 30 until an end thereof butts this stepped part 32a and is fixed with adhesive. Although, according to this embodiment, the hosel part 30 is provided so that a bottom end of the column 32 does not reach the sole part 21, it may be provided so that the bottom end of the column 32 reaches the sole part 21.

The crown part 10, the lower part 20, the hosel part 30, the face part 40, and thin-plate reinforcing pieces 11 and 23, which will be described below, are manufactured of titanium or titanium alloy by casting, forging or press forming. The thin-plate reinforcing pieces 11 and 23 may be manufactured by cutting a sheet material. The sole part 21 and the thin-plate reinforcing pieces 11 and 23 are preferred to be manufactured of a material having an excellent cold-workability such as pure titanium, Ti-3AL-2.5V, Ti-1.5Al. The sole part 21 is preferred to be more workable than ordinary Ti-6Al-4V in order to be marked with a commercial logo or an indentation.

The thin-plate reinforcing piece 11 is welded to the vicinity of the center in the toe-to-heel direction of the lower surface on the face side edge of the crown part 10. According to this embodiment, the thin-plate reinforcing piece 11 is spot-welded on the crown part 10. This spot welding is preferred to be done at plural positions spaced in the longitudinal direction of the thin-plate reinforcing piece 11. The thin-plate reinforcing piece 11 is disposed such that the face side edge thereof is aligned with the face side edge of the crown part 10.

The thin-plate reinforcing piece 23 is welded to the vicinity of the center in the toe-to-heel direction of an upper surface adjacent to the face side edge of the sole part 21 of the lower part 20. The thin-plate reinforcing piece 23 is disposed such that the face side edge thereof is aligned with the face side edge of the lower part 20. According to this embodiment, the thin-plate reinforcing piece 23 is spot-welded on the sole part 21 and reference numeral 23w in FIG. 13 indicates this welding mark.

In this embodiment, the golf club head 1 is a driver type golf club head having a loft angle of 7 to 15°.

Preferably, the thickness of the crown part 10 is 0.6 mm to 1.2 mm, more particularly 0.6 mm to 1.0 mm. The thickness of the thin-plate reinforcing piece 11 on the crown part 10 is preferred to be 0.8 mm to 1.5 mm and more preferred to be 1.0 mm to 1.2 mm. The length of the thin-plate reinforcing piece 11 in the to-to-heel direction is preferred to be 20 mm to 50 mm, and more preferred to be 25 mm to 35 mm. The length thereof in the direction of the ball flying line (length (width) perpendicular to the face surface) is preferred to be 6 mm to 20 mm and more preferred to be 8 mm to 12 mm.

Preferably, the thickness of the sole part 21 is 0.8 mm to 1.5 mm, more preferably 0.8 mm to 1.1 mm. Preferably, the thickness of the thin-plate reinforcing piece 23 is 0.8 mm to 1.5 mm, more preferably 1.0 mm to 1.2 mm. Preferably, the length of the thin-plate reinforcing piece 23 in the toe-to-heel direction is 20 mm to 50 mm, more preferably 25 mm to 40 mm. Preferably, the length thereof in the direction of the ball flying line (length (width) perpendicular to the face surface) is 6 mm to 20 mm, more preferably 8 mm to 12 mm. Also, the length of the thin-plate reinforcing piece 23 on the sole part 21 in the toe-to-heel direction is preferred to be larger than the length of the thin-plate reinforcing piece 11 on the crown part 10 in the toe-to-heel direction.

Figure 13:
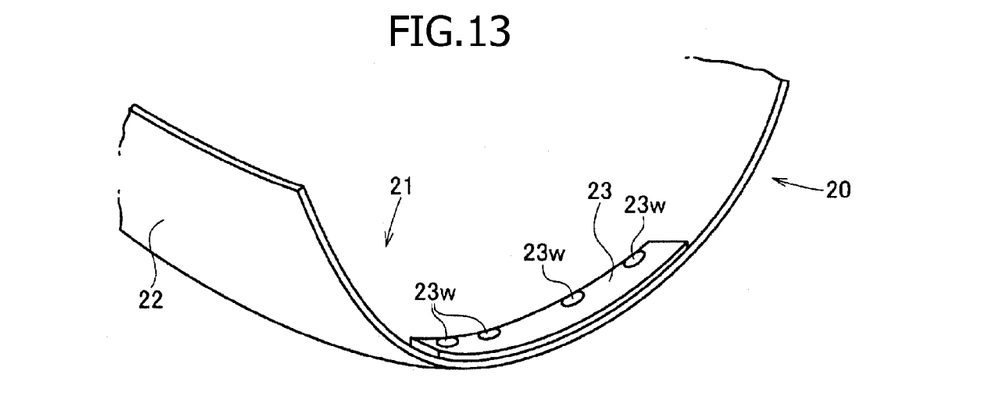
FIG. 13 is an enlarged view of a portion III in FIG. 12.
Figure 14:
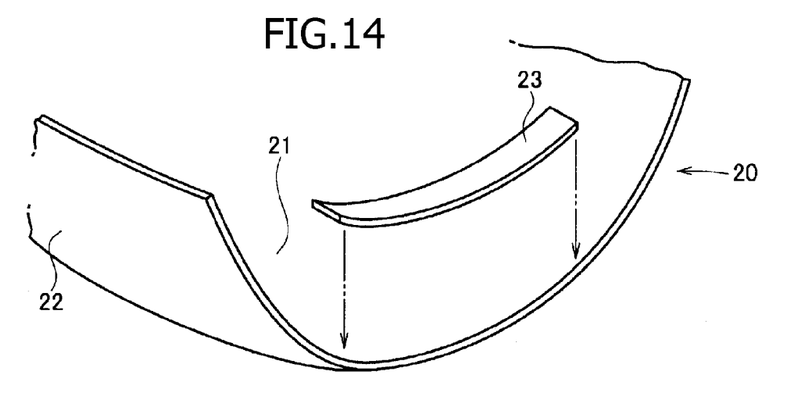
FIG. 14 is a perspective view illustrating an embodiment of a manufacturing method for the golf club head according to the present invention.
Figure 15:
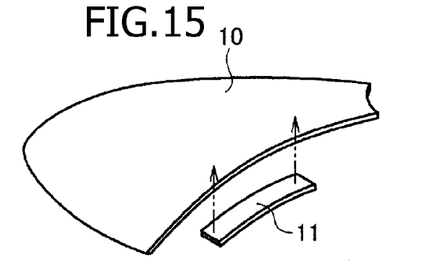
FIG. 15 is a perspective view illustrating an embodiment of a manufacturing method for the golf club head according to the present invention.
Figure 16:
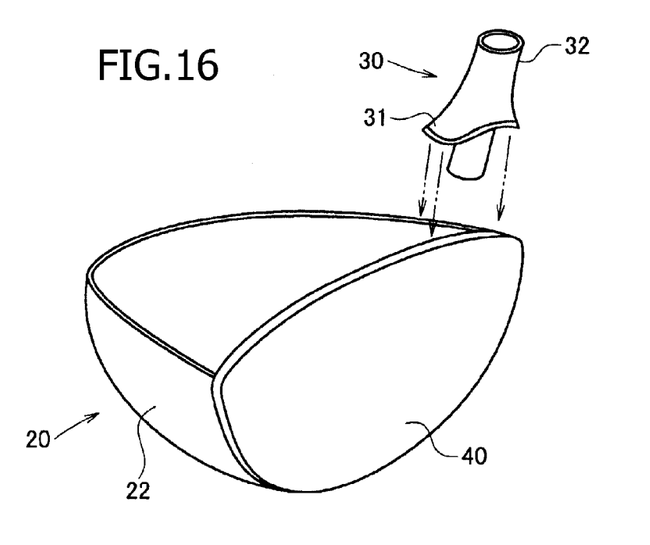
FIG. 16 is a perspective view illustrating an embodiment of a manufacturing method for the golf club head according to the present invention.
Figure 18:
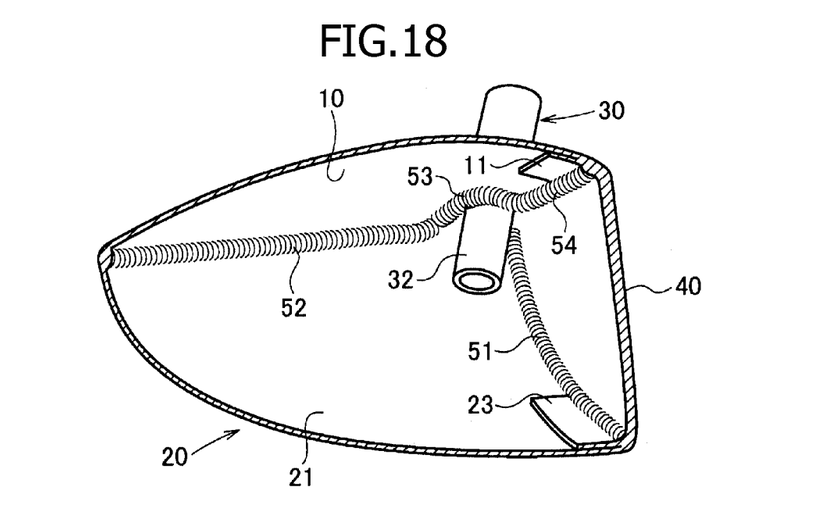
FIG. 18 is a sectional view of an embodiment of the golf club head according to the present invention, taken along a back-and-forth direction, illustrating the interior of the golf club head seen from slightly backward.

To manufacture the golf club head 1, first, the thin-plate reinforcing piece 11 is spot-welded on the bottom surface adjacent to the face side edge of the crown part 10 at plural positions as shown in FIG. 15. As shown in FIG. 14, the thin-plate reinforcing piece 23 is spot-welded on the upper surface adjacent to the face side edge of the sole part 21 of the lower part 20 at plural positions to produce a condition as shown in FIG. 13. Next, the face part 40 is attached to the lower part 20, and by TIG-welding with argon gas blown to the lower part 20 from the inner space of the lower part 20, that is, from the back side of the face part 40, the lower part 20 is integrated with the face part 40 to produce a condition as shown in FIG. 16. Reference numeral 51 in FIG. 18 shows a welded metal which is generated on inner surfaces of the lower part 20 and the face part 40 by fusion. This welded metal 51 runs through the face side edge above the thin-plate reinforcing piece 23 and this welded metal 51 integrates the sole part 21 including the thin-plate reinforcing piece 23 with the face part 40.

Figure 17:
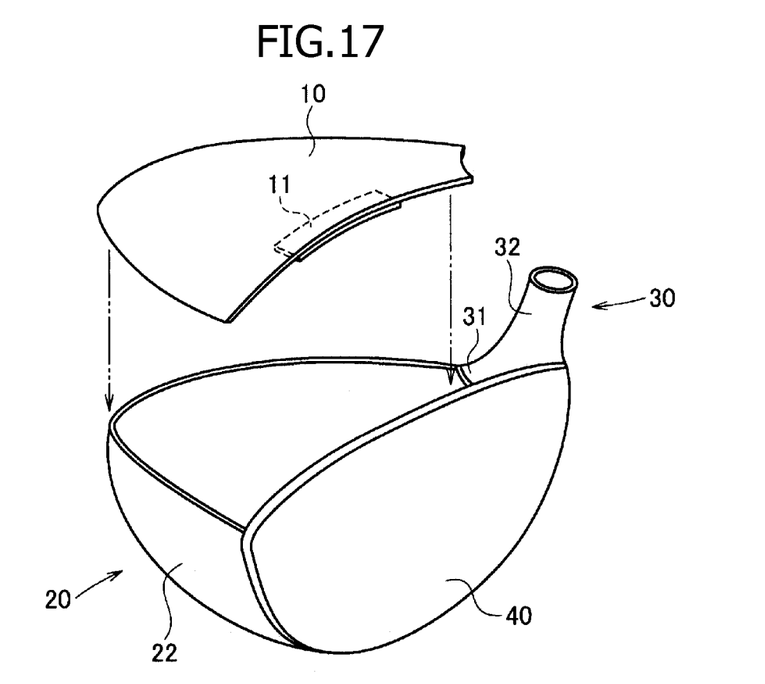
FIG. 17 is a perspective view illustrating an embodiment of a manufacturing method for the golf club head according to the present invention.

As shown in FIG. 16, the skirt part 31 of the hosel part 30 is fit to upper edges of the lower part 20 and the face part 40 and the skirt part 31 is TIG-welded by blowing argon gas on the upper edges of the lower part 20 and the face part 40 while a lie angle is adjusted to produce a condition as shown in FIG. 17. At this time, the welding is preferred to be carried out in both ways from the inside and the outside of the lower part 20.

Next, the crown part 10 is mounted on the lower part 20 and the face part 40 and brought in contact with the skirt part 31 of the hosel part 30. Then, the crown part 10 is TIG-welded on the lower part 20, the face part 40 and the skirt part 31 by blowing argon gas from the outside of the golf club head 1. At the same time, the face part 40 is TIG-welded by blowing argon gas from the outside of the face part 40 against an entire circumference of the face part 40. As a result, the entire circumference of the face part 40 is welded on the lower part 20 again. When welding the entire circumference of the face part 40, the face sides of the thin-plate reinforcing pieces 11, 23 are entirely welded while welding beads are formed successively from the outside to the inside of the head.

Reference numeral 52 in FIG. 18 indicates a welded metal between the lower part 20 and the crown part 10, reference numeral 53 indicates a welded metal between the crown part 10 and the skirt part 31 and reference numeral 54 indicates a welded metal between the crown part 10 and the face part 40. In the meantime, the thin-plate reinforcing piece 11 is also welded on the face part 40 in the vicinity of the center of the face side edge of the crown part 10.

After welding the crown part 10, the lower part 20, the hosel part 30 and the face part 40, a variety of finishing work such as grinding and painting are implemented to complete a golf club head product.

In the golf club head 1 having the above-described configuration, the thin-plate reinforcing piece 23 is spot-welded to the vicinity of the center in the toe-to-heel direction of the upper surface adjacent to the face side edge of the lower part 20 and an area in the vicinity of the center of the bottom edge of the face part 40 is welded to this thin-plate reinforcing piece 23. Therefore, in the vicinity of the center of the face side edge of the sole part 21 provided with the thin-plate reinforcing piece 23, shrinkage of a weld between the face part 40 and the sole part 21 hardly affects the sole part 21, and a high weld strength is secured between the vicinity of the center of the face side edge of the sole part 21 and the face part 40. Furthermore, the thin-plate reinforcing piece 11 is spot-welded to the vicinity of the center in the toe-to-heel direction of the bottom surface adjacent to the face side edge of the crown part 10. The area in the vicinity of the center of the upper edge of the face part 40 is welded on this thin-plate reinforcing piece 11 also. In the vicinity of the center of the face side edge of the crown part 10 provided with the thin-plate reinforcing piece 11, shrinkage of weld between the face part 40 and the crown part 10 hardly affects the crown part 10, and a high weld strength is secured between the vicinity of the center of the face side edge of the crown part 10 and the face part 40.

Additionally, provision of the thin-plate reinforcing pieces 11 and 23 intensifies the strength of an area in the vicinity of the center of the face side edge of the sole part 21 and the crown part 10. Furthermore, the natural frequencies of the crown part 10 and the sole part 21 are changed more compared to a case in which no thin-plate reinforcing plates are provided. Thus, an impact sound is improved by the provision of the thin-plate reinforcing pieces 11 and 23.

In the golf club head 1, the thickness of the crown part 10 and the sole part 21 is small and the thin-plate reinforcing pieces 11 and 23 are provided only in the vicinity of the center of each of the face side edges of the crown part 10 and the sole part 21. As a result, the provision of the thin-plate reinforcing pieces 11, 23 does not increase the weight of the golf club head very much. Furthermore, because the width of the thin-plate reinforcing pieces 11 and 23 in the direction of the ball flying line is small, the depth of the gravity center of the golf club head 1 is rarely decreased.

The above-described second embodiment is an example of the present invention and the present invention may be carried out in the form of other embodiments. For example, the length of the thin-plate reinforcing piece 11 on the crown side in the toe-to-heel direction may be smaller than the length of the thin-plate reinforcing piece 23 on the sole side in the toe-to-heel direction. Consequently, the height of the gravity center of the golf club head 1 is prevented from being raised, thereby minimizing an influence of the weight of the thin-plate reinforcing pieces 11 and 23. A gap may be provided between the thin-plate reinforcing piece 23 on the sole side and the sole part 21. In this case, the spot-welding is implemented partially at plural positions along an edge of the thin-plate reinforcing piece, so that the characteristic of radiation of welding heat is improved. Although the above embodiment employs TIG-welding, it is permissible to employ plasma welding.

Figure 19:
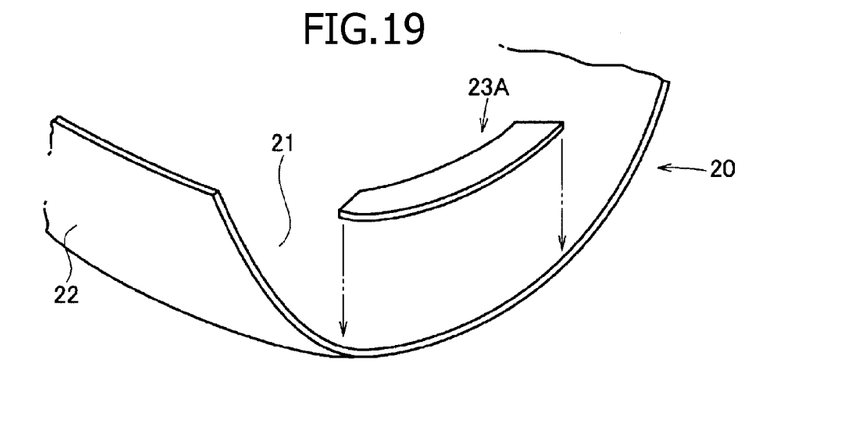
FIG. 19 is a perspective view illustrating another embodiment of a manufacturing method for the golf club head according to the present invention.

The thin-plate reinforcing pieces 11 and 23 may have other shapes than the ones shown in this application. The examples will be shown in FIGS. 19 to 23. FIG. 19 shows a trapezoidal thin-plate reinforcing piece 23A whose length in the toe-to-heel direction is decreased toward the back. The thin-plate reinforcing piece 11 may be formed in the same shape.

Figure 20:
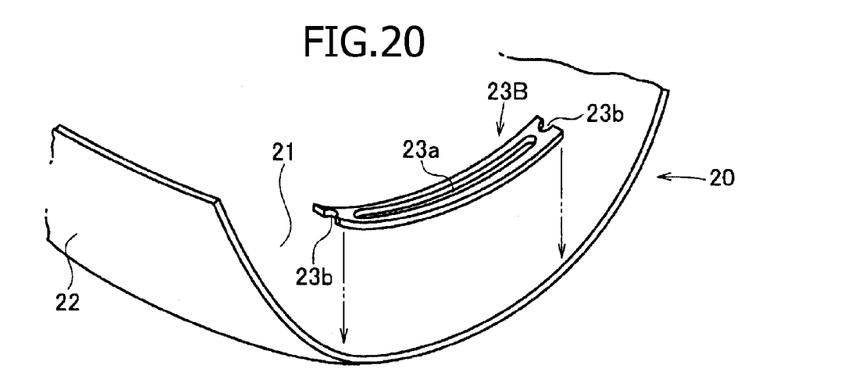
FIG. 20 is a perspective view illustrating another embodiment of a manufacturing method for the golf club head according to the present invention.

FIG. 20 shows a thin-plate reinforcing piece 23B having a punched-out part 23a and cut-out parts 23b. The punched-out part 23a is formed of an elongated oval hole extending in the longitudinal direction of the thin-plate reinforcing piece 23B. Also, plural punched-out parts may be provided. The cut-out parts 23b may be provided in each short side of both ends of the thin-plate reinforcing piece 23B. The thin-plate reinforcing piece 11 may also be configured in the same way.

The thin-plate reinforcing pieces 23A, 23B shown in FIGS. 19 and 20 are lighter than the thin-plate reinforcing piece 23.

Figure 21:
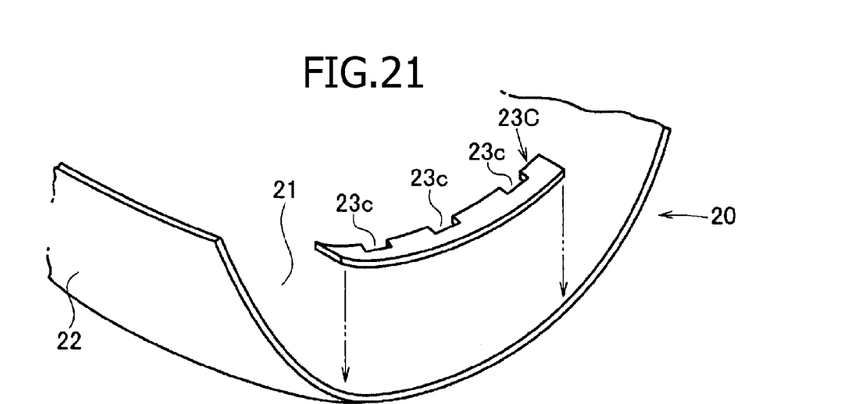
FIG. 21 is a perspective view illustrating another embodiment of a manufacturing method for the golf club head according to the present invention.
Figure 22:
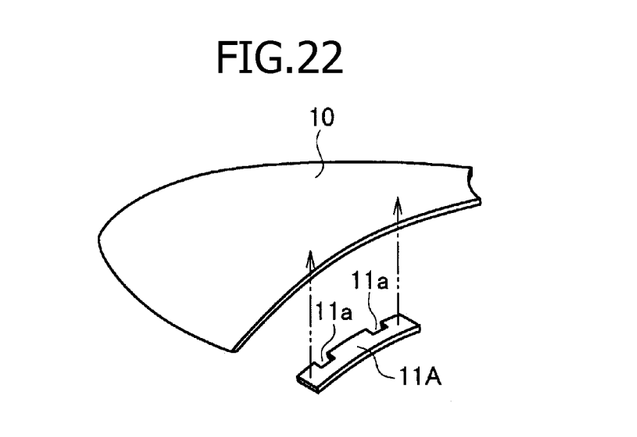
FIG. 22 is a perspective view illustrating another embodiment of a manufacturing method for the golf club head according to the present invention.

FIGS. 21 and 22 show thin-plate reinforcing pieces 23C and 11A each having plural cut-out parts 23c and 11a provided at a rear side thereof. These thin-plate reinforcing pieces 23C and 11A are lighter than the thin-plate reinforcing pieces 23 and 11 and due to provision of the cut-out parts 23c and 11a, and are easy to deform into a curved shape along the sole part 21 or the crown part 10. In the meantime, the cut-out parts 23c and 11a are not limited to a square as shown in the figures, but may be formed in various other shapes such as triangles, semicircles, and semiellipses.

Figure 23:
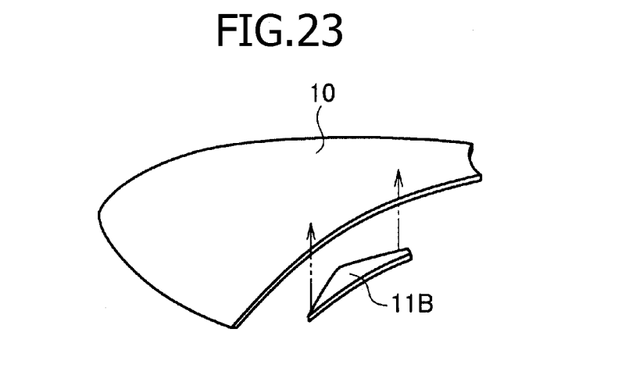
FIG. 23 is a perspective view illustrating another embodiment of a manufacturing method for the golf club head according to the present invention.

FIG. 23 shows a triangular thin-plate reinforcing piece 11B which is projected toward the back. This thin-plate reinforcing piece 11B is lighter than the thin-plate reinforcing piece 11. Although this thin-plate reinforcing piece 11B is a triangle, it may be formed in a trapezoidal shape as shown in FIG. 19, or in a circular or elliptical shape.

The thin-plate reinforcing pieces shown in FIGS. 19, 20, 23 may be provided with the cut-out part at the rear side thereof as shown in FIGS. 21 and 22. Furthermore, the thin-plate reinforcing pieces shown in FIGS. 10 to 12 may be formed in a trapezoidal or other shape.

The reference numerals in the attached drawings are as follows:
1: golf club head
10: crown part
20: lower part
21: sole part
22: side part
23, 23A, 23B, 23C: thin-plate reinforcing piece
24: thick reinforcing piece
30: hosel part
40: face part
11, 11A, 11B: thin-plate reinforcing piece

What is claimed is:

1. A golf club head having a hollow structure, which is made of a metal, comprising:
   a lower part comprising a sole part and a side part which are integrally formed, the lower part further comprising a first reinforcing piece having a first thickness and a second reinforcing piece having a second thickness greater than the first thickness,
      wherein the first reinforcing piece is welded on an inner surface of the sole part in a substantially halfway portion between a heel side and a toe side of the sole part and is aligned with a face side edge of the sole part, and
      wherein the second reinforcing piece is welded on an inner surface of the first reinforcing piece in a substantially halfway portion between a heel side and a toe side of the first reinforcing piece and is aligned with a face side edge of the first reinforcing piece; and
   a face part welded to the sole part and the first and second reinforcing pieces of the lower part.

2. The golf club head according to claim 1, wherein the sole part has a thickness from 0.8 to 1.5 mm, the first reinforcing piece has the first thickness from 0.8 to 1.5 mm, and the second reinforcing has the second thickness from 1.0 to 6.0 mm.

3. The golf club head according to claim 1, wherein the first reinforcing piece has a length from 20 to 50 mm and has a width from 6 to 20 mm, and the second reinforcing piece has a length from 10 to 43 mm and has a width from 3 to 20 mm, the length of the first and second reinforcing pieces extending in a direction from the heal side to the toe side, and the width of the first and second reinforcing pieces extending in a direction along a ball flying line.

4. A method for manufacturing a golf club head having a hollow structure, which is made of a metal, comprising:
   welding a first reinforcing piece having a first thickness on an inner surface of a sole part of a lower part in a substantially halfway portion between a heel side and a toe side of the sole part so that the first reinforcing piece is aligned with a face side edge of the sole part, the sole part being integrally formed with a side part of the golf club head into the lower part;
   welding a second reinforcing piece having a second thickness greater than the first thickness on an inner surface of the first reinforcing piece so that the second reinforcing piece is aligned with a face side edge of the first reinforcing piece;
   welding a face part to the first and second reinforcing pieces from an inner side of the lower part to attach the face part to the lower part;
   welding a hosel part to the lower part and the face part;
   welding a crown part to the lower part, the face part and the hosel part; and
   welding the face part to the lower part from an outer side of the golf club head.

5. A golf club head having a hollow structure, which is made of a metal, comprising:
   a sole part comprising a first reinforcing piece, the first reinforcing piece being welded on an inner surface of the sole part in a substantially halfway portion between a heel side and a toe side of the sole part and being aligned with a face side edge of the sole part;
   a crown part comprising a second reinforcing piece, the second reinforcing piece being welded on an inner surface of the crown part in a substantially halfway portion between a heel side and a toe side of the crown part and is aligned with a face side edge of the crown part; and
   a face part welded to the sole part, the crown par, and the first and second reinforcing pieces.

6. The golf club head according to claim 5, wherein the sole part has a thickness from 0.8 to 1.5 mm, the first reinforcing piece has the first thickness from 0.8 to 1.5 mm, the crown part has a thickness from 0.6 to 1.2 mm, and the second reinforcing has the second thickness from 0.8 to 1.5 mm.

7. The golf club head according to claim 5, wherein the first reinforcing piece has a length from 20 to 50 mm and has a width from 6 to 20 mm, and the second reinforcing piece has a length from 20 to 50 mm and has a width from 6 to 20 mm, the length of the first and second reinforcing pieces extending in a direction from the heal side to the toe side, and the width of the first and second reinforcing pieces extending in a direction along a ball flying line.

8. The golf club head according to claim 5, wherein the sole part is integrally formed with a side part of the golf club head into a lower part, and the lower part is welded to the face part and the crown part.

9. A method for manufacturing a golf club head having a hollow structure, which is made of a metal, comprising:
   welding a first reinforcing piece on an inner surface of a sole part of a lower part in a substantially halfway portion between a heel side and a toe side of the sole part so that the first reinforcing piece is aligned with a face side edge of the sole part, the sole part being integrally formed with a side part of the golf club head into the lower part;
   welding a second reinforcing piece on an inner surface of a crown part in a substantially halfway portion between a heel side and a toe side of the crown part so that the second reinforcing piece is aligned with a face side edge of the crown part;

welding a face part to the first reinforcing piece from an inner side of the lower part to attach the face part to the lower part;

welding a hosel part to the lower part and the face part;

welding the crown part including the second reinforcing piece to the lower part, the face part and the hosel part; and welding the face part to the lower part from an outer side of the golf club head.

* * * * *